(12) United States Patent
Johnston et al.

(10) Patent No.: US 8,336,319 B2
(45) Date of Patent: Dec. 25, 2012

(54) THERMAL MANAGEMENT SYSTEM WITH DUAL MODE COOLANT LOOPS

(75) Inventors: Vincent George Johnston, Half Moon Bay, CA (US); Andrew David Baglino, San Francisco, CA (US); Scott Ira Kohn, Redwood City, CA (US); Vineet Haresh Mehta, Mountain View, CA (US); Christopher David Gadda, Sunnyvale, CA (US); Curt Raymond O'Donnell, Sunnyvale, CA (US); Wulfer Adrijn de Bruijn, Redwood City, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 408 days.

(21) Appl. No.: 12/835,486

(22) Filed: Jul. 13, 2010

(65) Prior Publication Data

US 2011/0296855 A1 Dec. 8, 2011

Related U.S. Application Data

(60) Provisional application No. 61/351,800, filed on Jun. 4, 2010.

(51) Int. Cl.
*F25B 7/00* (2006.01)
(52) U.S. Cl. .............................................. 62/79; 62/434
(58) Field of Classification Search ........... 62/79, 324.6, 62/513, 160, 434, 335, 185
See application file for complete search history.

(56) References Cited

U.S. PATENT DOCUMENTS

| | | | |
|---|---|---|---|
| 5,035,115 A * | 7/1991 | Ptasinski | 60/712 |
| 5,058,391 A | 10/1991 | Periot | |
| 5,291,960 A | 3/1994 | Brandenburg et al. | |
| 5,339,776 A * | 8/1994 | Regueiro | 123/196 CP |
| 5,483,807 A | 1/1996 | Abersfelder et al. | |
| 5,537,956 A | 7/1996 | Rennfeld et al. | |
| 5,584,360 A * | 12/1996 | Wedeven | 184/6.22 |
| 5,604,441 A * | 2/1997 | Freese et al. | 324/663 |
| 5,647,534 A | 7/1997 | Kelz et al. | |
| 5,669,335 A * | 9/1997 | Hollis | 123/41.1 |
| 5,705,742 A * | 1/1998 | Fox et al. | 73/114.79 |
| 6,124,644 A | 9/2000 | Olson et al. | |
| 6,138,466 A | 10/2000 | Lake et al. | |
| 6,186,254 B1 | 2/2001 | Mufford et al. | |
| 6,213,233 B1 | 4/2001 | Sonntag et al. | |
| 6,305,345 B1 * | 10/2001 | Bakhtine | 123/245 |
| 6,347,528 B1 | 2/2002 | Iritani et al. | |
| 6,357,541 B1 | 3/2002 | Matsuda et al. | |
| 6,360,835 B1 | 3/2002 | Skala | |
| 6,394,207 B1 | 5/2002 | Skala | |
| 6,448,535 B1 | 9/2002 | Ap | |
| 6,464,027 B1 | 10/2002 | Dage | |
| 6,467,286 B2 | 10/2002 | Hasebe et al. | |
| 6,481,230 B2 | 11/2002 | Kimishima et al. | |
| 6,561,155 B1 * | 5/2003 | Williams | 123/196 S |

(Continued)

*Primary Examiner* — Mohammad Ali
(74) *Attorney, Agent, or Firm* — Patent Law Office of David G. Beck

(57) ABSTRACT

A dual mode, thermal management system for use in a vehicle is provided. At a minimum, the system includes a first coolant loop in thermal communication with a battery system, a second coolant loop in thermal communication with at least one drive train component (e.g., electric motor, power electronics, inverter), and a dual mode valve system that provides means for selecting between a first mode where the two coolant loops operate in parallel, and a second mode where the two coolant loops operate in series.

24 Claims, 5 Drawing Sheets

U.S. PATENT DOCUMENTS

| | | |
|---|---|---|
| 6,569,550 B2 | 5/2003 | Khelifa |
| 6,575,258 B1 | 6/2003 | Clemmer |
| 6,651,761 B1 | 11/2003 | Hrovat et al. |
| 6,708,513 B2 | 3/2004 | Koehler et al. |
| 6,743,539 B2 | 6/2004 | Clingerman et al. |
| 6,772,603 B2 | 8/2004 | Hsu et al. |
| 6,797,421 B2 | 9/2004 | Assarabowski et al. |
| 7,048,044 B2 | 5/2006 | Ban et al. |
| 7,147,071 B2 | 12/2006 | Gering et al. |
| 7,150,159 B1 | 12/2006 | Brummett et al. |
| 7,191,858 B2 | 3/2007 | Vanderwees et al. |
| 7,259,469 B2 | 8/2007 | Brummett et al. |
| 7,591,143 B2 | 9/2009 | Zeigler et al. |
| 7,591,303 B2 | 9/2009 | Zeigler et al. |
| 2002/0027027 A1 | 3/2002 | Skala |
| 2002/0040896 A1 | 4/2002 | Ap |
| 2003/0193009 A1 | 10/2003 | Dill |
| 2005/0133215 A1 | 6/2005 | Ziehr et al. |
| 2005/0241865 A1 | 11/2005 | Varenne |
| 2008/0251235 A1 | 10/2008 | Zhou |
| 2009/0024256 A1 | 1/2009 | Adams et al. |
| 2009/0227194 A1 | 9/2009 | Johnston |
| 2009/0280395 A1 | 11/2009 | Nemesh et al. |

\* cited by examiner

THERMAL MANAGEMENT SYSTEM WITH DUAL MODE COOLANT LOOPS

CROSS-REFERENCE TO RELATED APPLICATION

This application claims the benefit of the filing date of U.S. Provisional Patent Application Ser. No. 61/351,800, filed Jun. 4, 2010, the disclosure of which is incorporated herein by reference for any and all purposes.

FIELD OF THE INVENTION

The present invention relates generally to thermal control systems and, more particularly, to a vehicle thermal management architecture that allows thermal and performance optimization depending upon ambient conditions and component operating characteristics.

BACKGROUND OF THE INVENTION

An extremely large percentage of the world's vehicles run on gasoline using an internal combustion engine. The use of such vehicles, more specifically the use of vehicles which rely on fossil fuels, i.e., gasoline, creates two problems. First, due to the finite size and limited regional availability of such fuels, major price fluctuations and a generally upward pricing trend in the cost of gasoline are common, both of which can have a dramatic impact at the consumer level. Second, fossil fuel combustion is one of the primary sources of carbon dioxide, a greenhouse gas, and thus one of the leading contributors to global warming. Accordingly, considerable effort has been spent on finding alternative drive systems for use in both personal and commercial vehicles.

Electric vehicles offer one of the most promising alternatives to vehicles that use internal combustion drive trains. One of the principal issues involved in designing an efficient electric drive train as well as a vehicle that is "user friendly" is thermal management, primarily due to the required operating conditions of the battery cells and the need to provide on-demand heating and cooling within the passenger cabin. As a result, the thermal management systems used in many electric and hybrid vehicles have limited capabilities and/or are overly complex. For example, early generation electric vehicles often used multiple independent thermal management subsystems. Such an approach is inherently inefficient as each subsystem requires its own components (e.g., pumps, valves, refrigerant systems, etc.).

To overcome some of the problems associated with the use of independent thermal subsystems, U.S. Pat. No. 6,360,835 and related U.S. Pat. No. 6,394,207 disclose a thermal management system utilizing multiple heat transfer circuits which share the same heat transfer medium. The heat transfer circuits are in fluid communication with one another, thus allowing hot heat transfer medium to flow from the high temperature circuit into the low temperature circuit, and cooler heat transfer medium to flow from the low temperature circuit into the high temperature circuit. Although this system appears to overcome some of the limitations of the prior systems, it is still relatively complex due to the interaction of the two heat transfer circuits.

In an alternate thermal control system disclosed in co-pending U.S. patent application Ser. No. 11/786,108, an efficient cooling system is disclosed that utilizes multiple cooling loops and a single heat exchanger. The cooling loops in at least one disclosed embodiment include a cooling loop associated with the battery system, a cooling loop associated with the HVAC system, and a cooling loop associated with the drive system (e.g., motor).

Although the prior art discloses multiple techniques for cooling the motor and/or batteries in an electric vehicle, and in some instances combining such cooling with the vehicle's passenger compartment HVAC system, further system simplification and system efficiency improvements are desired. The present invention provides such a thermal management system.

SUMMARY OF THE INVENTION

The present invention provides a dual mode, thermal management system for use in a vehicle (e.g., an electric vehicle). At a minimum, the system includes a first coolant loop in thermal communication with a battery, a second coolant loop in thermal communication with at least one drive train component (e.g., electric motor, power electronics, inverter), and a dual mode valve system that provides means for selecting between a first mode where the two coolant loops operate in parallel, and a second mode where the two coolant loops operate in series. The dual mode valve system may be comprised of a four-way valve configured such that in one mode valve inlet A is coupled to valve outlet A and valve inlet B is coupled to valve outlet B, and in a second mode valve inlet A is coupled to valve outlet B and valve inlet B is coupled to valve outlet A. The dual mode valve system may be comprised of a four-way valve configured such that in one mode a first portion of the first coolant loop is coupled to a second portion of the first coolant loop and a first portion of the second coolant loop is coupled to a second portion of the second coolant loop, and in a second mode the first portion of the first coolant loop is coupled to the second portion of the second coolant loop and the first portion of the second coolant loop is coupled to the second portion of the first coolant loop. The dual mode valve system may be comprised of a pair of three-way valves configured such that the first three-way valve couples a first portion of the first coolant loop to a second portion of the first coolant loop when the dual mode valve system is configured in the first mode; the second three-way valve couples a first portion of the second coolant loop to a second portion of the second coolant loop when the dual mode valve system is configured in the first mode; the first three-way valve couples the first portion of the first coolant loop to the second portion of the second coolant loop when the dual mode valve system is configured in the second mode; and the second three-way valve couples the first portion of the second coolant loop to the second portion of the first coolant loop when the dual mode valve system is configured in the second mode. The system may include a refrigeration subsystem in thermal communication with the first coolant loop, for example using a heat exchanger, the refrigeration subsystem including, for example, a refrigerant, compressor, condenser and thermostatic expansion valve. The system may include a heater in thermal communication with the first coolant loop. The system may include a charger in thermal communication with the second coolant loop. The second coolant loop may include a radiator, for example coupled to the second coolant loop using a bypass valve, where the bypass valve allows the second coolant loop to either be coupled to, or decoupled from, the radiator. The system may further include a refrigeration subsystem in thermal communication with the first coolant loop via a heat exchanger, and a cabin HVAC system coupleable to the refrigeration subsystem.

In another aspect of the invention, a method of managing thermal loads within an electric vehicle is provided, the method including the steps of selecting between a first mode and a second mode of circulating coolant through a drive train coolant loop and a battery coolant loop, where in the first mode coolant is circulated in the drive train and battery system coolant loops in parallel, and where in the second mode coolant is circulated serially through the drive train and battery coolant loops. In the first mode the method may further comprise the steps of coupling a first portion of the drive train coolant loop to a second portion of the drive train coolant loop and coupling a first portion of the battery coolant loop to a second portion of the battery coolant loop, and in the second mode the method may further comprise the steps of coupling the first portion of the drive train coolant loop to the second portion of the battery coolant loop and coupling the first portion of the battery coolant loop to the second portion of the drive train coolant loop. The mode selecting step may utilize a four-way valve or a pair of three-way valves. The method may further comprise the step of thermally coupling a charger to the drive train coolant loop. The method may further comprise the step of thermally coupling a refrigeration subsystem to the battery coolant loop when additional battery cooling is desired. The method may further comprise the step of thermally coupling a heater to the battery coolant loop when additional battery heating is desired. The method may further comprise the step of coupling the drive train coolant loop to a radiator, for example using a bypass valve, when additional drive train cooling is desired.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably and may refer to any of a variety of different cell types, chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within a single piece or multi-piece housing, the individual batteries electrically interconnected to achieve the desired voltage and capacity for a particular application. The terms "battery" and "battery system" may be used interchangeably and as used herein refer to an electrical energy storage system that has the capability to be charged and discharged such as a battery, battery pack, capacitor or supercapacitor. The terms "refrigeration subsystem" and "cooling subsystem" may be used interchangeably and refer to any of a variety of different types of refrigeration/cooling subsystems that may be used to cool other system components and subsystems. The term "electric vehicle" as used herein refers to either an all-electric vehicle, also referred to as an EV, plug-in hybrid vehicles, also referred to as a PHEV, or a hybrid vehicle (HEV), a hybrid vehicle utilizing multiple propulsion sources one of which is an electric drive system. It should be understood that identical element symbols used on multiple figures refer to the same component, or components of equal functionality. Additionally, the accompanying figures are only meant to illustrate, not limit, the scope of the invention and should not be considered to be to scale.

Figure 1:
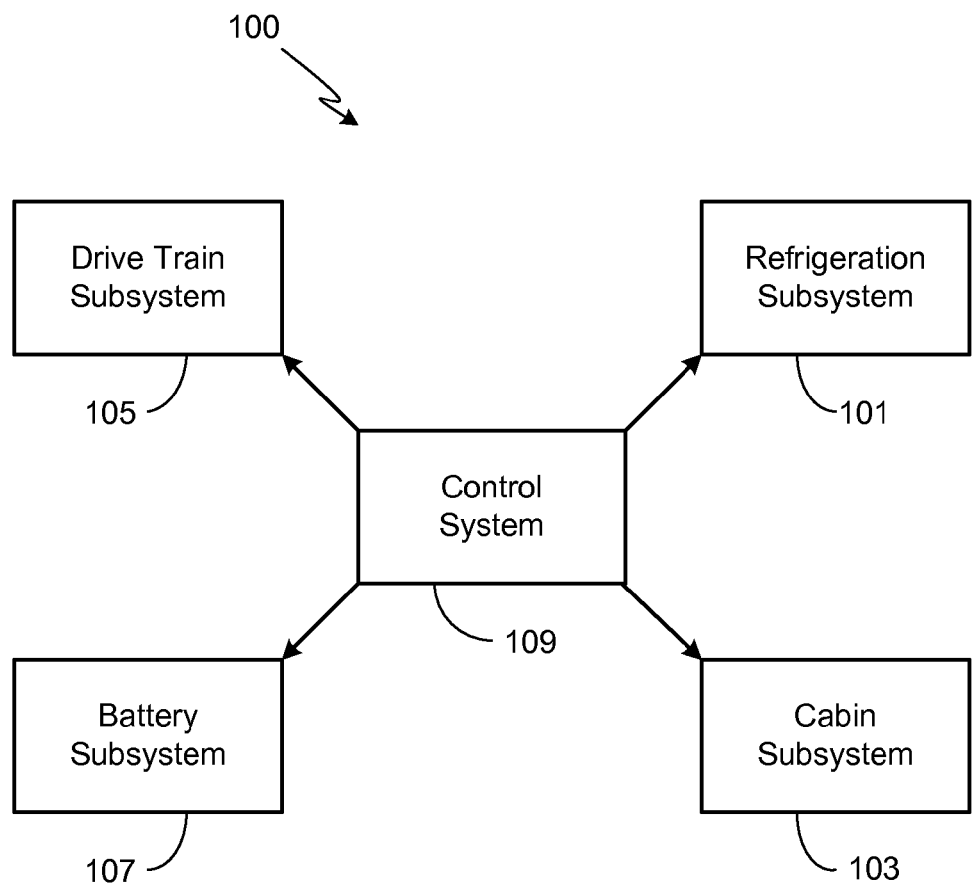
FIG. 1 provides a high level diagram of the various subsystems used in the thermal management system of the invention.

FIG. 1 is a high level diagram that illustrates the basic subsystems within the thermal management system 100 of a typical electric vehicle. In general, the thermal management system of such a vehicle includes a refrigeration subsystem 101, a passenger cabin subsystem 103, a drive train subsystem 105, and a battery subsystem 107. Thermal management system 100 also includes a control system 109. Further detail for each of these subsystems is provided below, some of which may be shown in the exemplary embodiments illustrated in FIGS. 2-5.

Refrigeration subsystem 101 is designed to be thermally coupled to one or more of the other thermal subsystems comprising system 100 whenever it is necessary, or desirable, to reduce the temperature in the thermally-coupled subsystem. Refrigeration subsystem 101, also referred to herein as a cooling subsystem, may utilize a refrigerant (e.g., R134a) compression system, a thermo-electric cooler, or other means. In a preferred embodiment shown in FIGS. 2-5, subsystem 101 includes a compressor 201 that compresses the low temperature refrigerant vapor in the subsystem into a high temperature vapor. The refrigerant vapor then dissipates a portion of the captured heat when it passes through condenser 203, thereby leading to a phase change from vapor to liquid, the liquid remaining at a high temperature and pressure. Preferably the performance of condenser 203 is enhanced by using a blower fan 205. The liquid phase refrigerant then passes through a receiver-dryer 207 which removes moisture from the condensed refrigerant. In the preferred embodiment, and as shown, refrigerant line 209 is coupled to a cabin evaporator 211 via a thermal expansion valve 213, and to a heat exchanger 215 (also referred to herein as a chiller) via a thermal expansion valve 217. Thermal expansion valves 213 and 217 control the flow rate of refrigerant into evaporator 211 and chiller 215, respectively.

Heating, ventilation and cooling (HVAC) subsystem 103 provides temperature control for the vehicle's passenger cabin, typically via a plurality of ducts and vents. Preferably HVAC subsystem 103 includes one or more fans 219 that are used to circulate air throughout the cabin on demand, regardless of whether the air is heated, cooled, or simply fresh air from outside the vehicle. To provide cool air, refrigerant is circulated through evaporator 211. To provide warm air during normal vehicle operation, HVAC subsystem 103 may utilize a heater 221, for example a PTC heater integrated within evaporator 211. Although not shown, in an alternate embodiment HVAC subsystem 103 may include means such as a heat exchanger for transferring thermal energy from either drive train subsystem 105 or battery subsystem 109 to the HVAC subsystem.

Subsystem 105 is comprised of a continuous power train cooling loop 223 that is used to cool the drive motor 225, the vehicle's principal traction motor. While a single drive motor is shown, it will be appreciated that an EV utilizing the present invention may be designed to employ more than a single drive motor, for example a drive motor per axle, per wheel, etc. Preferably cooling loop 223 is also thermally coupled to other vehicle electronic components, for example the power electronics module and inverter 227 for motor 225. If the system includes a charger 229, for example for charging a rechargeable battery using an external power source, preferably the charger is coupled to cooling loop 223 as well. Alternately, charger 229 may be coupled to the battery system cooling loop. In at least one embodiment, the system electronics (e.g., power electronics 227) are mounted to a cold plate that is used to transfer the heat away from the electronics and into the liquid coolant (i.e., the heat transfer medium) contained in the cooling loop. Cooling loop 223 also includes a pump 231 to circulate the coolant through the cooling loop, a radiator 233 for discharging the heat to the ambient atmosphere, and a coolant reservoir 235A. Preferably the system also includes a fan 237 for forcing air through radiator 233 when insufficient air is passing through the radiator to achieve the desired level of cooling, for example when the vehicle is not moving. Subsystem 105 preferably also includes a valve 239, as shown, that allows radiator 233 to be decoupled from coolant loop 223. The position of valve 239 couples radiator 233 to coolant loop 223 in the exemplary embodiment shown in FIG. 2.

Battery subsystem 107 includes battery(s) 241 coupled to a coolant loop 243 containing a coolant (i.e., a heat transfer medium). In a typical electric vehicle, battery 241 is comprised of a plurality of batteries. One or more circulation pumps 245 pump the coolant through battery(s) 241, typically via a heat transfer plate or one or more coolant conduits (not shown) that are in thermal communication with the battery(s). Although a dedicated cooling subsystem may be used in conjunction with subsystem 107, preferably the coolant contained in loop 243 is cooled via heat transfer with the refrigerant in heat exchanger 215, assuming that the thermostatic valve 217 allows refrigerant from subsystem 101 to pass through heat exchanger 215. Additionally, in a preferred embodiment of the invention, cooling loop 243 is also thermally coupled to a heater 247 (e.g., a PTC heater), thus insuring that the temperature of battery(s) 241 can be maintained within its preferred operating range regardless of the ambient temperature. Subsystem 107 also includes a coolant reservoir 235B. Preferably coolant reservoirs 235A and 235B are combined into a single, dual loop reservoir as shown.

It will be appreciated that there are numerous techniques that may be used by control system 109 to control the operation of the individual thermal management subsystems in general, and more specifically the amount of cooling supplied by refrigeration subsystem 101 to the other subsystems. Typically control system 109 uses a plurality of temperature detectors (not shown) to monitor the temperature within the various vehicle components (e.g., battery(s) 241, motor 225, drive electronics 227, etc.), within one or more regions of the coolant loops (e.g., coolant loop 223, etc.), and within one or more locations within the passenger cabin. The monitored temperatures at these various locations are used by control system 109 to determine the operation of the various thermal management subsystems. In response to the monitored temperatures and the desired temperature range for the cabin and the various vehicle components, the amount of heating and/or cooling applied by each subsystem is regulated, for example via flow valves (not shown) within the coolant loops, pump rates of the various circulation pumps (e.g., pumps 231 and 245), heater operation (e.g., heaters 221 and 247), and blower fan operation (e.g., fans 205, 219, 237). Control system 109 may operate automatically based on programming implemented by a processor, or system 109 may be manually controlled, or system 109 may use some combination of manual and automated control.

In addition to controlling refrigerant flow rates, coolant flow rates and the operation of the heaters, fans, etc., the present invention allows the overall architecture of the thermal management system to be quickly and easily altered, thus providing different means of controlling and routing thermal energy among the vehicle's subsystems. As a result, the thermal management system of the invention provides a sophisticated and flexible way to respond to changing environmental conditions (e.g., varying air temperature, solar loading, etc.) as well as changing vehicle component thermal loads and requirements. In the configuration illustrated in FIG. 2, referred to herein as the parallel architecture, drive train subsystem 105 is operated independently of battery subsystem 107, with only minimal thermal communication as provided by a small coolant passageway 251 that connects the chambers of coolant reservoir 235 A/B and maintains consistent coolant levels between the chambers. Note that in at least one embodiment of the invention, drive train subsystem 105 and battery subsystem 107 may utilize separate coolant reservoirs.

Figure 2:
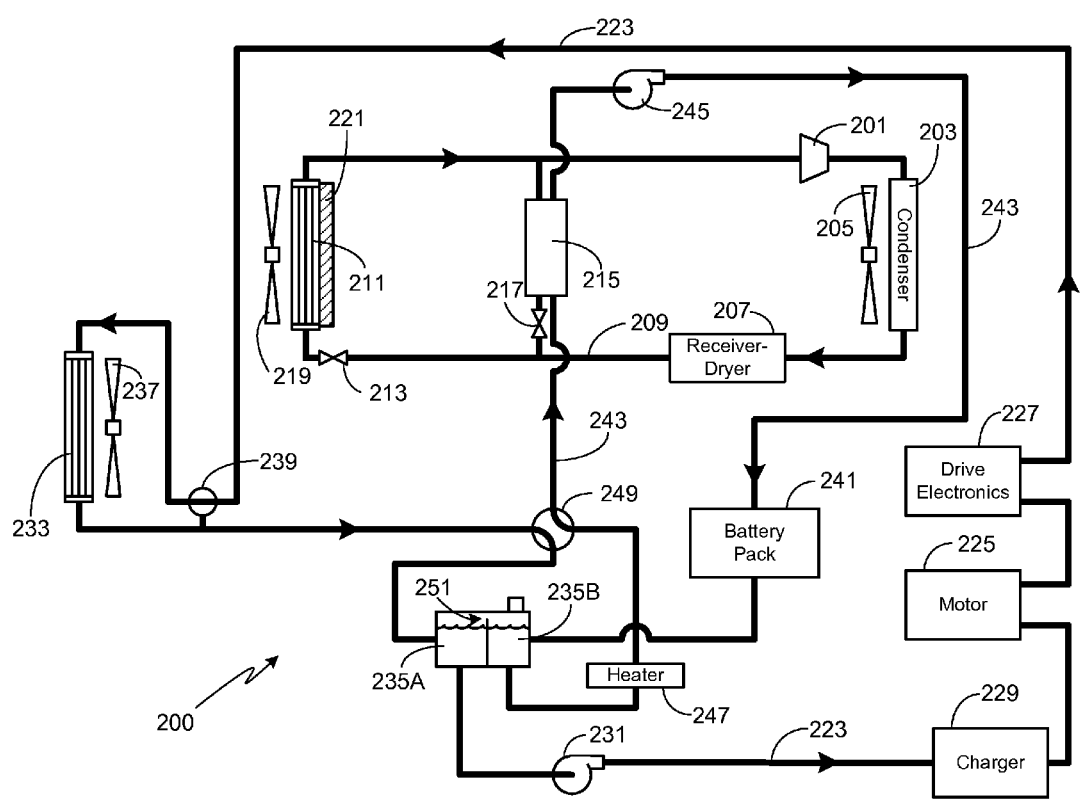
FIG. 2 illustrates a preferred embodiment of the architecture of a thermal management system in which the drive train and battery subsystems operate in parallel.
Figure 3:
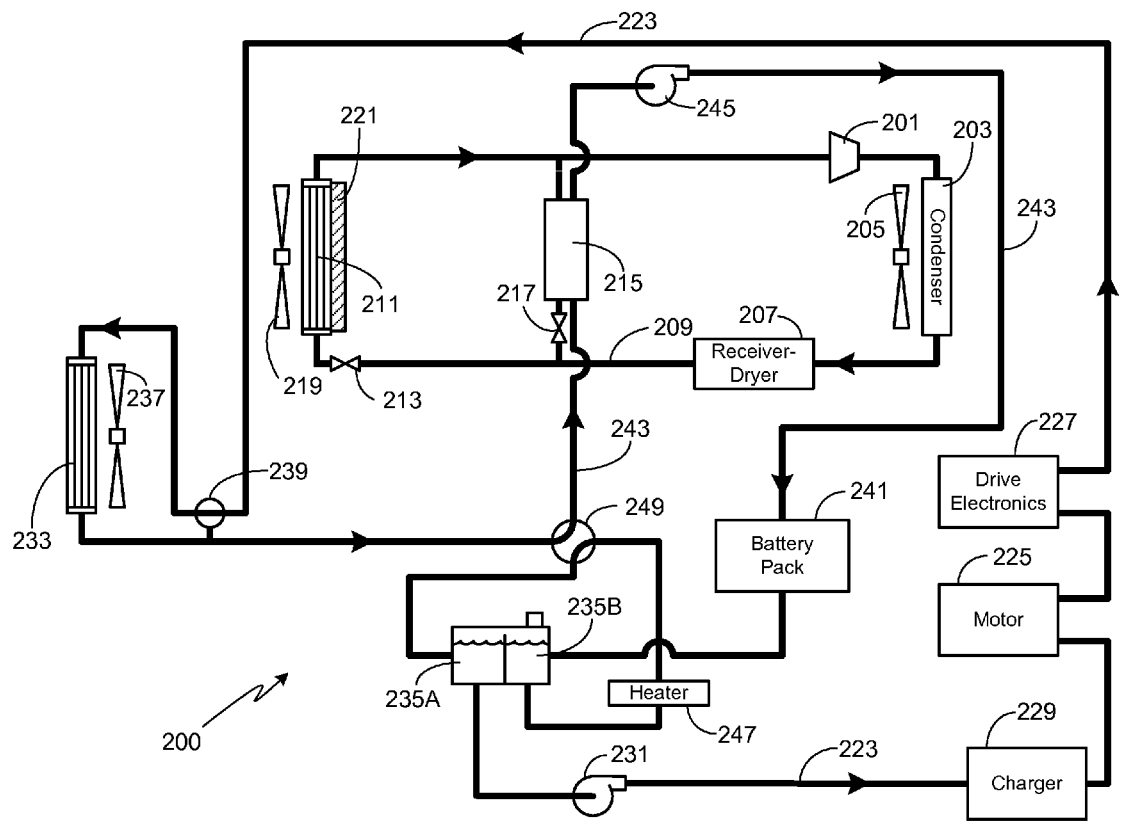
FIG. 3 illustrates the embodiment shown in FIG. 2, configured to allow the drive train and battery subsystems to operate in series.

FIG. 3 illustrates thermal management system 200, as shown in FIG. 2, reconfigured to allow serial operation of drive train subsystem 105 and battery subsystem 107. In system 200, this change in thermal architecture is achieved by repositioning valve 249. In this preferred embodiment of the invention, valve 249 is a four-way cylindrical, butterfly or ball valve.

In the serial configuration, coolant is initially pumped through coolant line 223, which is thermally coupled to drive motor(s) 225 and associated electronics (e.g., drive electronics 227, charger 229). After passing by the drive train components, and as shown in FIG. 3, valve 249 couples coolant line 223 to coolant line 243, thereby allowing the flowing coolant to pass through battery(s) 241 after being warmed by the drive train components as shown.

The ability to either place the battery and drive train coolant subsystems in series or in parallel, depending upon both the external environment and the immediate operating characteristics of the components, allows thermal and performance optimization of a vehicle's subsystems. It will be appreciated that such thermal and performance optimization, in turn, leads to improved efficiency and associated operating cost savings.

Preferably control system 109 is configured to automatically control valve 249 based on the operating characteristics of the vehicle components and ambient conditions, all of which are preferably monitored by system 109. The determination of whether to operate subsystems 105 and 107 serially or in parallel is preferably made to optimize onboard energy usage, system thermal response and performance operating conditions. Some exemplary conditions for both serial and parallel operation are provided below.

Operating subsystem 105 and 107 serially, as shown in FIG. 3, improves system efficiency in a number of operating scenarios. For example:
    When the vehicle is cold, for example after being garaged over night or for an extended period of time, serial operation allows the coolant to be heated by the drive train components before passing through the battery system. As many energy sources, for example rechargeable batteries, have a minimum preferred operating temperature, this configuration allows the heat generated by the drive train components to heat the batteries. In at least one embodiment of a vehicle using the invention, this form of operation allows the elimination of heater 247, thus reducing system complexity, initial cost, and operating cost. In at least one alternate embodiment of a vehicle using the invention, this form of operation allows a reduction in the size and output of heater 247, thus reducing initial and operating costs. Note that this mode of operation may be used during driving when ambient temperatures are low and the batteries require heating, or when the vehicle is parked and the batteries require heating. In this mode, the temperature of the coolant and thus the efficiency of the system may be regulated by using valve 239 to select whether or not to pass the coolant through radiator 233 before it flows through the battery system. Fan 237 may be used to provide additional ambient airflow to increase heating if the ambient temperature exceeds the drive train outlet temperature.

In some situations the battery system may be too cold to be efficiently charged. By operating the subsystems serially, waste heat generated by charger 229 flows through the battery pack, thereby heating the batteries and allowing them to be efficiently charged with minimal, if any, supplemental heating by heater 247. An additional benefit of this approach is that it eliminates, or at least minimizes, the need to cool charger 229 during operation. Preferably in this mode, as the charger and the batteries heat up, they can be cooled (if necessary) by passing the coolant through radiator 233. Fan 237 may be used to provide additional cooling.

When the ambient temperature is relatively low, operating the subsystems serially allows both the drive train components and the battery system to be cooled using only radiator 233, with or without operation of fan 237, depending upon operating temperatures and vehicle speed. As a result, battery(s) 241 does not require cooling by cooling subsystem 101. Assuming that the cooling subsystem is not required for cabin cooling at this point in time, this mode of operation eliminates the need for operation of subsystem 101, further improving operational efficiency. Note that if necessary, coolant cooling may be augmented by cooling subsystem 101 via heat exchanger 215.

When the ambient temperature is extremely high, or if one or more of the vehicle's components is operating above its desired operating temperature, serial operation provides a convenient method for coupling the drive train coolant loop 223 to refrigeration subsystem 101 via heat exchanger 215. As shown in FIG. 3, in this operational mode the coolant in loop 223 may be cooled via refrigeration subsystem 101 below the temperature achievable via radiator 233 alone, and radiator 233 may be bypassed using valve 239 to avoid adding unwanted heat from the ambient environment to the refrigerated coolant. Additionally, even without operation of refrigeration subsystem 101, the drive train components benefit in this configuration by allowing excess drive train heat to be dumped into battery(s) 241, essentially using battery(s) 241 as a thermal capacitor.

FIG. 2 illustrates the parallel configuration for operating subsystems 105 and 107. A few exemplary operating scenarios include:

The parallel configuration allows independent temperature control over the drive train and battery subsystems, thus allowing each subsystem to be operated within its acceptable temperature range and with minimal expenditure of vehicle energy. Accordingly, battery(s) 241 may be cooled to whatever extent is desired through use of the refrigeration subsystem 101 and heat exchanger 215, or heated via heater 247. Control over the drive train components is achieved via radiator 233/fan 237 and radiator bypass valve 239.

In some instances, the batteries may already be at a preferred operating temperature even though the drive train is still cold. Parallel operation allows battery(s) 241 to be maintained at this temperature, or within the desired temperature range, while the drive train is still heating up. Note that by using valve 239 to bypass radiator 233, drive train heat-up may be expedited.

Depending upon the ambient temperature, in some instances during charging it is desirable to have independent temperature control of battery(s) 241 while cooling charger 229 solely via radiator 233.

It will be appreciated that at the heart of the invention is the ability to maximize system efficiency and/or improve system thermal performance by operating the drive train thermal subsystem and the battery thermal subsystem in either a serial configuration or a parallel configuration, depending upon the thermal needs of any of a variety of different system components (e.g., motor, charger, inverter, batteries, etc.), ambient temperature, vehicle speed, etc. Accordingly, it should be understood that the individual components and layout of the subsystems may vary from those in the exemplary embodiment without departing from the invention, e.g., the type of cooling/refrigeration subsystem, the way in which the cabin HVAC subsystem is coupled to the other subsystems, the number of heat exchangers, the number of circulating pumps/radiators/fans, etc. may all differ from system 200 without departing from the underlying invention. For example, in an exemplary modification of system 200, heater 247 is repositioned such that it is directly before battery(s) 241 in the coolant loop 243.

Figure 4:
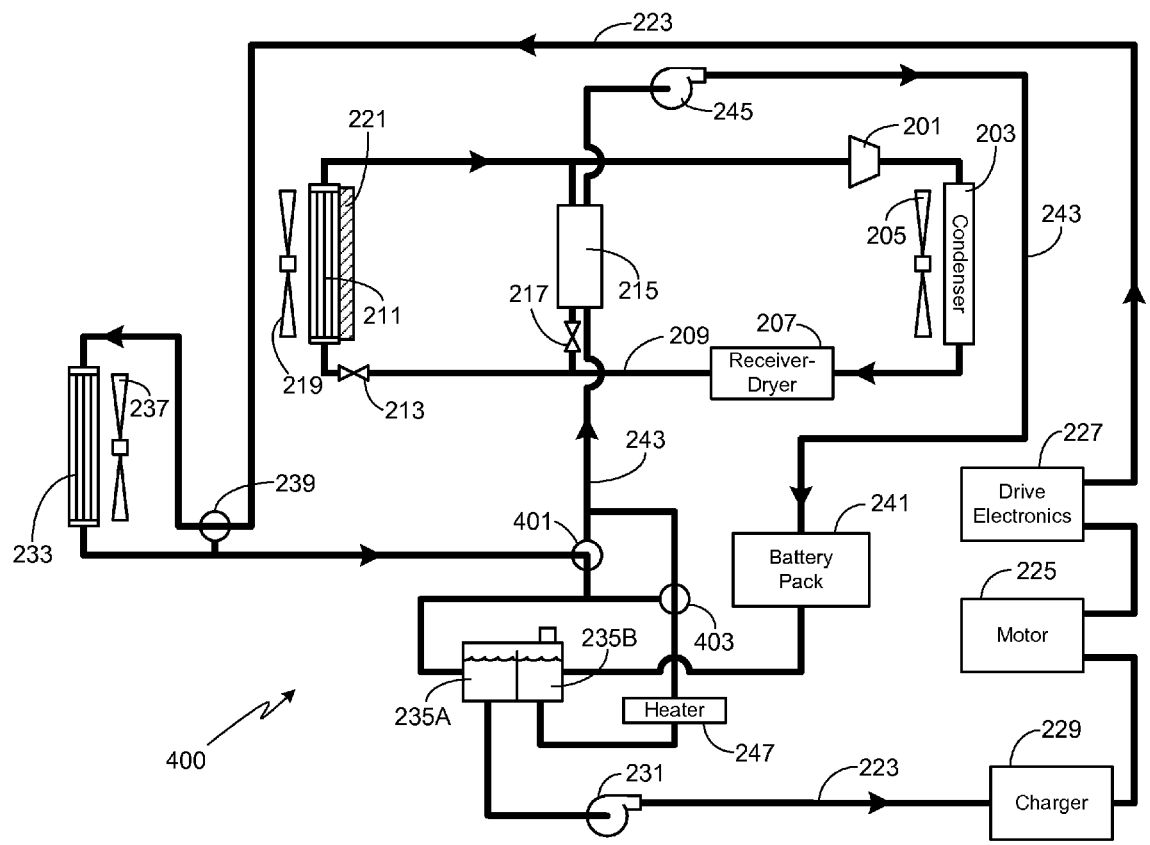
FIG. 4 illustrates the embodiment shown in FIG. 2, modified to use two, three-way valves instead of a single, four-way valve to switch between operational modes.
Figure 5:
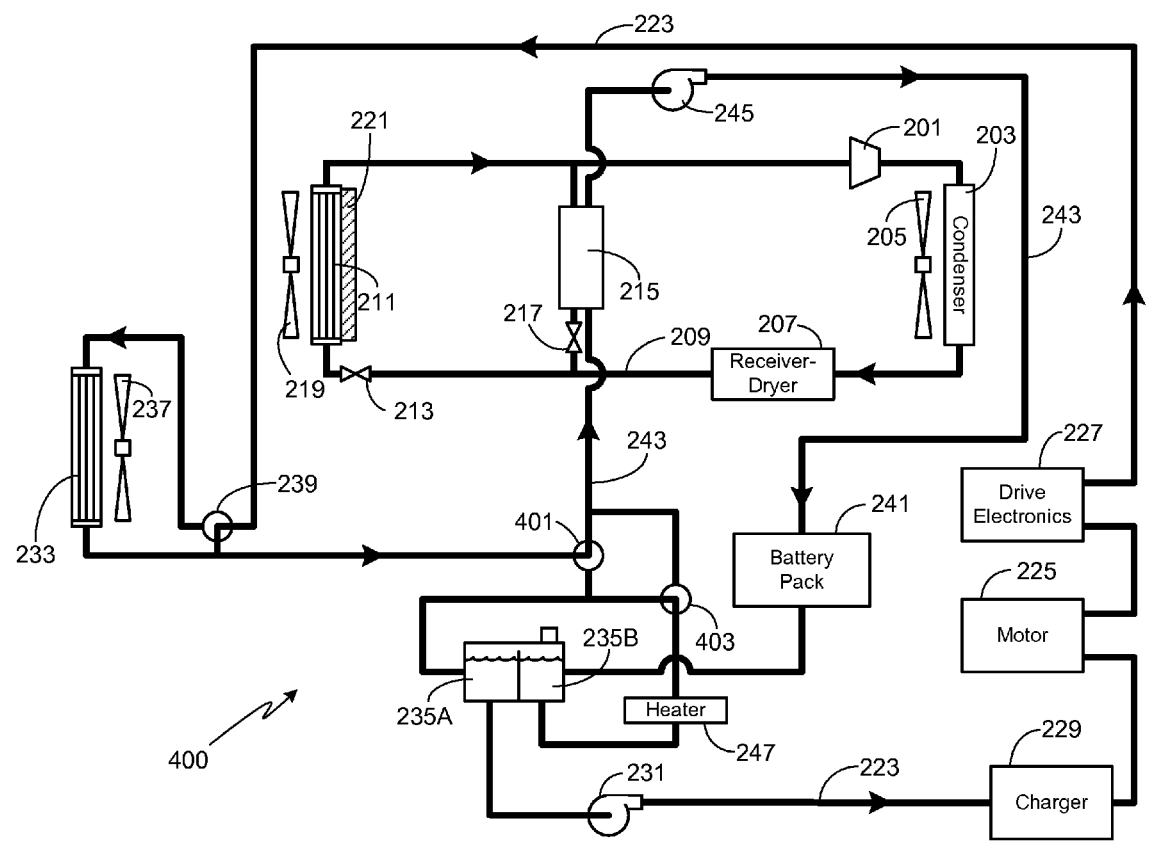
FIG. 5 illustrates the embodiment shown in FIG. 3, modified to use two, three-way valves instead of a single, four-way valve to switch between operational modes.

FIGS. 4 and 5 correspond to a minor modification of the system shown in FIGS. 2 and 3, respectively, specifically replacing four-way valve 249 with a pair of three-way valves 401 and 403. Although systems 200 and 400 operate in the same manner and offer the same performance and efficiency advantages, it will be appreciated that the use of a single four-way valve is preferred over two, three-way valves in order to reduce part count, cost, and system complexity while improving reliability. Note that in FIG. 5 radiator bypass valve 239 is shown in the bypass position, as opposed to the active radiator position shown in FIG. 4, thus illustrating this aspect of the invention.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A dual mode, vehicle thermal management system, comprising:
   a first coolant loop in thermal communication with a battery system, said first coolant loop comprising a first circulation pump for circulating a coolant within said first coolant loop, said first coolant loop further comprising a first coolant reservoir;
   a second coolant loop in thermal communication with at least one drive train component, said second coolant loop comprising a second circulation pump for circulating said coolant within said second coolant loop, said second coolant loop further comprising a second coolant reservoir, wherein said coolant is allowed to flow between said first and second coolant reservoirs; and a dual mode valve system, wherein said first coolant loop operates in parallel with and separate from said second coolant loop when said valve system is configured in a first mode, and wherein said first coolant loop is serially coupled to said second coolant loop when said valve system is configured in a second mode.

2. The dual mode, vehicle thermal management system of claim 1, wherein said dual mode valve system is comprised of a four-way valve, wherein said four-way valve configured in said first mode couples a first valve inlet to a first valve outlet and couples a second valve inlet to a second valve outlet, and wherein said four-way valve configured in said second mode couples said first valve inlet to said second valve outlet and couples said second valve inlet to said first valve outlet.

3. The dual mode, vehicle thermal management system of claim 1, wherein said dual mode valve system is comprised of a four-way valve, wherein said four-way valve configured in said first mode couples a first portion of said first coolant loop to a second portion of said first coolant loop and couples a first portion of said second coolant loop to a second portion of said second coolant loop, and wherein said four-way valve configured in said second mode couples said first portion of said first coolant loop to said second portion of said second coolant loop and couples said first portion of said second coolant loop to said second portion of said first coolant loop.

4. The dual mode, vehicle thermal management system of claim 1, wherein said dual mode valve system is comprised of a first three-way valve and a second three-way valve, wherein said first three-way valve couples a first portion of said first coolant loop to a second portion of said first coolant loop when said dual mode valve system is configured in said first mode, wherein said second three-way valve couples a first portion of said second coolant loop to a second portion of said second coolant loop when said dual mode valve system is configured in said first mode, wherein said first three-way valve couples said first portion of said first coolant loop to said second portion of said second coolant loop when said dual mode valve system is configured in said second mode, and wherein said second three-way valve couples said first portion of said second coolant loop to said second portion of said first coolant loop when said dual mode valve system is configured in said second mode.

5. The dual mode, vehicle thermal management system of claim 1, wherein said first and second coolant reservoirs comprise first and second chambers of a single coolant reservoir.

6. The dual mode, vehicle thermal management system of claim 1, wherein said battery system is comprised of a plurality of batteries.

7. The dual mode, vehicle thermal management system of claim 1, further comprising a refrigeration subsystem in thermal communication with said first coolant loop.

8. The dual mode, vehicle thermal management system of claim 7, further comprising a heat exchanger, wherein said refrigeration subsystem is in thermal communication with said first coolant loop via said heat exchanger.

9. The dual mode, vehicle thermal management system of claim 7, further comprising a heat exchanger, wherein said refrigeration subsystem is in thermal communication with said first coolant loop via said heat exchanger, and wherein said refrigeration subsystem further comprises a refrigerant, a compressor, a condenser and a thermostatic expansion valve.

10. The dual mode, vehicle thermal management system of claim 1, said first coolant loop further comprising a heater.

11. The dual mode, vehicle thermal management system of claim 1, wherein said at least one drive train component is comprised of at least one of a drive motor and a drive electronics, said drive electronics comprising an inverter.

12. The dual mode, vehicle thermal management system of claim 1, further comprising a charger in thermal communication with said second coolant loop.

13. The dual mode, vehicle thermal management system of claim 1, said second coolant loop further comprising a radiator.

14. The dual mode, vehicle thermal management system of claim 1, said second coolant loop further comprising a bypass valve, wherein said bypass valve in a first position couples said second coolant loop to a radiator, and wherein said bypass valve in a second position decouples said radiator from said second coolant loop.

15. The dual mode, vehicle thermal management system of claim 1, further comprising:
a refrigeration subsystem comprising a heat exchanger, wherein said first coolant loop is in thermal communication with said refrigeration subsystem via said heat exchanger; and
a cabin heating, ventilation and cooling (HVAC) subsystem coupleable to said refrigeration subsystem.

16. A method of managing thermal loads within an electric vehicle, the method comprising the steps of: selecting between a first mode and a second mode of circulating a coolant through a drive train coolant loop and a battery system coolant loop, wherein in said first mode, the method further comprises the steps of: circulating said coolant through said drive train coolant loop, said drive train coolant loop in thermal communication with at least one drive train component; and circulating said coolant through said battery system coolant loop, said battery system coolant loop in thermal communication with a battery system, wherein said step of circulating said coolant through battery system coolant loop is performed in parallel with said step of circulating said coolant through said drive train coolant loop; and wherein in said second mode, the method further comprises the steps of: serially circulating said coolant through said drive train coolant loop and said battery system coolant loop.

17. The method of claim 16, wherein in said first mode the method comprises the steps of coupling a first portion of said drive train coolant loop to a second portion of said drive train coolant loop and coupling a first portion of said battery system coolant loop to a second portion of said battery system coolant loop, and wherein in said second mode the method comprises the steps of coupling said first portion of said drive train coolant loop to said second portion of said battery system coolant loop and coupling said first portion of said battery system coolant loop to said second portion of said drive train coolant loop.

18. The method of claim 17, wherein said selecting step further comprises the steps of positioning a four-way valve in either a first position corresponding to said first mode, or in a second position corresponding to said second mode.

19. The method of claim 17, wherein in said first mode the method further comprises the steps of positioning a first three-way valve in a first position and positioning a second three-way valve in a first position, and wherein in said second mode the method further comprises the steps of positioning said first three-way valve in a second position and positioning said second three-way valve in a second position.

20. The method of claim 16, further comprising the step of thermally coupling said drive train coolant loop to a charger.

21. The method of claim 16, further comprising the step of thermally coupling said battery system coolant loop to a refrigeration subsystem via a heat exchanger, wherein said step of thermally coupling said battery system coolant loop to said refrigeration subsystem is performed when additional battery system cooling is desired.

22. The method of claim 16, further comprising the step of thermally coupling said battery system coolant loop to a heater, wherein said step of thermally coupling said battery system coolant loop to said heater is performed when additional battery system heating is desired.

23. The method of claim 16, further comprising the step of coupling said drive train coolant loop to a radiator when additional drive train cooling is desired.

24. The method of claim 23, further said step of coupling said drive train coolant loop to said radiator is performed using a bypass valve.

* * * * *